United States Patent
Moran et al.

(10) Patent No.: US 10,657,814 B2
(45) Date of Patent: May 19, 2020

(54) PARKING SPACE DETECTION METHOD AND SYSTEM

(71) Applicant: Municipal Parking Services, Inc., Minnetonka, MN (US)

(72) Inventors: Mark J. Moran, Woodbury, MN (US); Richard W. Kelley, II, Corcoran, MN (US); Marcus N. Schmidt, Minnetonka, MN (US)

(73) Assignee: Municipal Parking Services, Inc., Minnetonka, MN (US)

( * ) Notice: Subject to any disclaimer, the term of this patent is extended or adjusted under 35 U.S.C. 154(b) by 300 days.

(21) Appl. No.: 15/335,978

(22) Filed: Oct. 27, 2016

(65) Prior Publication Data
US 2017/0116857 A1   Apr. 27, 2017

Related U.S. Application Data (60) Provisional application No. 62/246,787, filed on Oct. 27, 2015.

(51) Int. Cl.
*G08G 1/14*    (2006.01)
*G06K 9/00*    (2006.01)
(Continued)

(52) U.S. Cl.
CPC ........... *G08G 1/14* (2013.01); *G06K 9/00758* (2013.01); *G06K 9/00771* (2013.01);
(Continued)

(58) Field of Classification Search
CPC .............................. G08G 1/14; G06K 9/00758
See application file for complete search history.

(56) References Cited

U.S. PATENT DOCUMENTS 5,777,951 A   7/1998   Mitschele et al.
5,845,268 A   12/1998  Moore
(Continued)

FOREIGN PATENT DOCUMENTS

CA   2567464 A1 *  11/2005  ............. G07B 15/02
CA   2567464 A1    11/2005
(Continued)

OTHER PUBLICATIONS

The International Search Report and Written Opinion rendered by the International Searching Authority for PCT/US16/59081, dated Mar. 10, 2017, 11 pages.
(Continued)

*Primary Examiner* — Moazzam Hossain
(74) *Attorney, Agent, or Firm* — Skaar Ulbrich Macari, P.A.

(57) ABSTRACT

Disclosed are devices, systems and methods for managing parking monitoring and enforcement. In one aspect, an in ground sensor provides a first vehicle detection technique and a video camera employing machine vision provides a second vehicle detection technique. A vehicle detection technique for a smart parking meter utilizes both of the first and second detection techniques to make a highly accurate determination of a vehicle entering a parking space and a vehicle exiting a parking space. The second detection technique can be used to perform a double check on the first technique, or vice versa.

20 Claims, 5 Drawing Sheets

(51) Int. Cl.
*G07C 1/30* (2006.01)
*G08G 1/04* (2006.01)
*G08G 1/017* (2006.01)
*G07B 15/02* (2011.01)
*G08G 1/042* (2006.01)

(52) U.S. Cl.
CPC ......... *G06K 9/00812* (2013.01); *G07B 15/02* (2013.01); *G07C 1/30* (2013.01); *G08G 1/0175* (2013.01); *G08G 1/04* (2013.01); *G08G 1/042* (2013.01); *G08G 1/142* (2013.01); *G08G 1/147* (2013.01); *G06K 2009/00738* (2013.01)

(56) References Cited

U.S. PATENT DOCUMENTS

| | | | |
|---|---|---|---|
| 6,229,455 B1 | 5/2001 | Yost et al. | |
| 7,104,447 B1* | 9/2006 | Lopez | G06Q 20/206 235/381 |
| 7,393,134 B2 | 7/2008 | Mitschele | |
| 7,579,964 B2 | 8/2009 | Nath et al. | |
| 7,714,742 B1 | 5/2010 | Noworolski et al. | |
| 7,874,482 B2 | 1/2011 | Mitschele | |
| 8,120,513 B2 | 2/2012 | Ioli | |
| 8,487,754 B2 | 7/2013 | Mitschele | |
| 8,666,117 B2 | 3/2014 | Bulan et al. | |
| 8,682,036 B2 | 3/2014 | Wang et al. | |
| 8,737,690 B2 | 5/2014 | Bulan et al. | |
| 8,744,132 B2 | 6/2014 | Bulan et al. | |
| 9,129,524 B2 | 9/2015 | Delibaltov et al. | |
| 9,171,213 B2* | 10/2015 | Bulan | G06K 9/00785 |
| 9,367,966 B2 | 6/2016 | Fan et al. | |
| 9,773,351 B2 | 9/2017 | Hudson et al. | |
| 10,018,703 B2 | 7/2018 | Bernal et al. | |
| 2001/0012241 A1* | 8/2001 | Dee | G07F 17/24 368/90 |
| 2003/0169183 A1 | 9/2003 | Korepanov et al. | |
| 2004/0074685 A1* | 4/2004 | Tham | G01D 5/145 180/168 |
| 2006/0028919 A1* | 2/2006 | Mitschele | G04F 1/005 368/90 |
| 2006/0136131 A1* | 6/2006 | Dugan | G01V 3/081 701/300 |
| 2006/0152349 A1 | 7/2006 | Ratnakar | |
| 2007/0150335 A1* | 6/2007 | Arnett | G06F 21/31 705/7.31 |
| 2008/0319837 A1 | 12/2008 | Mitschele | |
| 2010/0328103 A1 | 12/2010 | Goldman et al. | |
| 2011/0099126 A1* | 4/2011 | Belani | G06Q 30/0284 705/418 |
| 2011/0270669 A1 | 11/2011 | Rowe et al. | |
| 2012/0092190 A1 | 4/2012 | Stefik et al. | |
| 2012/0095791 A1* | 4/2012 | Stefik | G06Q 10/02 705/5 |
| 2012/0127308 A1* | 5/2012 | Eldershaw | G08B 13/1672 348/143 |
| 2012/0130777 A1 | 5/2012 | Kaufman | |
| 2012/0158466 A1 | 6/2012 | John | |
| 2012/0286968 A1 | 11/2012 | Jones et al. | |
| 2013/0117077 A1 | 5/2013 | Li et al. | |
| 2013/0138481 A1 | 5/2013 | Handley | |
| 2013/0258107 A1 | 10/2013 | Delibaltov et al. | |
| 2013/0265419 A1 | 10/2013 | Bulan et al. | |
| 2013/0265423 A1* | 10/2013 | Bernal | G06Q 30/0284 348/148 |
| 2013/0265426 A1 | 10/2013 | Fan et al. | |
| 2013/0266185 A1 | 10/2013 | Bulan et al. | |
| 2013/0266187 A1 | 10/2013 | Bulan et al. | |
| 2013/0266188 A1 | 10/2013 | Bulan et al. | |
| 2013/0266190 A1 | 10/2013 | Wang et al. | |
| 2014/0176349 A1* | 6/2014 | Smullin | G08G 1/142 340/932.2 |
| 2014/0214499 A1 | 7/2014 | Hudson et al. | |
| 2014/0214500 A1 | 7/2014 | Hudson et al. | |
| 2014/0266803 A1* | 9/2014 | Bulan | G06K 9/00785 340/932.2 |
| 2014/0343891 A1 | 11/2014 | Becker et al. | |
| 2014/0372155 A1* | 12/2014 | Wang | G06Q 10/02 705/5 |
| 2015/0066349 A1* | 3/2015 | Chan | G01C 21/3407 701/400 |
| 2015/0084790 A1 | 3/2015 | Arpin et al. | |
| 2015/0106172 A1 | 4/2015 | Salama | |
| 2015/0117705 A1 | 4/2015 | Zhang et al. | |
| 2015/0138001 A1* | 5/2015 | Davies | G08G 1/149 340/932.2 |
| 2017/0024619 A1* | 1/2017 | Wu | G06K 9/00812 |
| 2017/0101089 A1* | 4/2017 | Bales | B60W 30/06 |
| 2017/0116790 A1* | 4/2017 | Kusens | G06Q 30/0284 |
| 2017/0168155 A1* | 6/2017 | Richard | G01S 13/86 |
| 2017/0249626 A1* | 8/2017 | Marlatt | G01V 3/081 |

FOREIGN PATENT DOCUMENTS

| | | |
|---|---|---|
| DE | 202009013742 U1 | 2/2010 |
| WO | 2006063079 A2 | 6/2006 |
| WO | 2010069002 A1 | 6/2010 |
| WO | 2014152369 A2 | 9/2014 |
| WO | 2015118084 A1 | 8/2015 |

OTHER PUBLICATIONS

Extended European Search Report to the corresponding European Patent Application No. 16860776.0 rendered by the European Patent Office (EPO) dated Jun. 14, 2019, 10 pages.

* cited by examiner

PARKING SPACE DETECTION METHOD AND SYSTEM

PRIORITY

This application claims the priority benefit of U.S. Provisional Application No. 62/246,787, filed on Oct. 27, 2015, which is hereby incorporated herein by reference in its entirety.

FIELD

The present invention relates generally to parking systems and, more particularly, to methods, systems and devices for automatically detecting the presence of a vehicle in a parking space with a high degree of accuracy.

BACKGROUND

Smart parking meter systems have been developed, such as those disclosed in U.S. Pat. Pub. Nos. 2014/0214499 A1 and 2014/0214500 A1 (which are both incorporated herein by reference in their entirety herein), which can monitor a given parking space for violations and automatically issue a citation electronically if a violation occurs. In order for such smart parking meters to operate automatically, they must have the ability to detect when a vehicle enters and leaves the parking space being monitored. Attempts to use in-ground sensors have been made. Alternatively, attempts have been made to use the images collected by the smart parking meter's camera(s) to determine vehicle presence. Both methods have drawbacks.

In-ground sensors typically sense magnetic field strength. For example, the sensor is embedded in the roadway above the location where a vehicle would be parked. When a vehicle is parked over the sensor, the magnetic field increases above a pre-set threshold value, which causes the meter to conclude that a vehicle is present in the monitored space.

A vehicle leaving the parking space is determined in the similar, but opposite manner. The magnetic field drops below a pre-set threshold, which is read by the meter as a change of state to indicate a vehicle leaving the monitored space.

Unfortunately, the in-ground magnetic sensors are prone to magnetic bouncing, which is where the magnetic field reading fluctuates due to a variety of factors. For example, a large industrial truck, such as a plow, driving by on the street next to the parking space will cause an increase and then a decrease in the measured magnetic field. This can cause the meter to correspondingly incorrectly determine that the parked vehicle has left the parking space and then re-entered the space. As a result, the vehicle could be issued a ticket even though it never moved. Weather can similarly affect the operation of the magnetic in ground sensors. Applicant has found that the in-ground magnetic sensors are only about 92-93% accurate.

Employing machine vision using the cameras on the meters poses problems as well. For example, machine vision at night or in rain or snow is less reliable, and sun angles reflecting off of vehicles and shining into the cameras can cause reading anomalies. The cameras can also become covered with snow or dirt, which compromises their ability to read vehicle presence.

Thus, there is a need to provide improved automated vehicle detection systems and methods.

SUMMARY

Disclosed are devices, systems and methods for managing parking monitoring and enforcement. In one aspect, an in ground sensor provides a first vehicle detection technique and a video camera employing machine vision provides a second vehicle detection technique. A vehicle detection technique for a smart parking meter utilizes both of the first and second detection techniques to make a highly accurate determination of a vehicle entering a parking space and a vehicle exiting a parking space. The second detection technique can be used to perform a double check on the first technique, or vice versa.

The disclosure includes a method of determining whether a vehicle is present in a parking space. The method can include monitoring the parking space with a first vehicle detection technique, monitoring the parking space with a second vehicle detection technique, and concluding that the vehicle is present in the parking space only when both of the first and second vehicle detection techniques indicate that the vehicle is present in the parking space.

The method can further include concluding that the vehicle is not present in the parking space only when both of the first and second vehicle detection techniques indicate that the vehicle is not present in the parking space.

Monitoring the parking space with the first vehicle detection technique can include disposing a magnetic sensor beneath the parking space, and sensing a change in the magnetic field in the parking space with the magnetic sensor. Magnetic field data can be broadcast from the magnetic sensor to a parking meter. The parking meter can include a processor, a memory, and software code stored in the memory. The monitoring of the parking space with the second vehicle detection technique can include performing a machine vision analysis of the parking space with a camera. The machine vision can be a background (foreground) subtraction process performed on video imaged by a video camera. The video camera can be housed inside of the parking meter or can be placed remote from the meter and coupled or networked with the meter.

A conclusion that the state of the vehicle has not changed can be reached when one of the first and second vehicle detection techniques indicates that the vehicle is not present in the parking space and the other of the first and second vehicle detection techniques indicates that the vehicle is present in the parking space.

The parking space can be monitored for a change of vehicle state for a predetermined length of time, and a conclusion that the vehicle state has changed can be reached only if a monitored parking space state change persists for the entire predetermined length of time.

A measured result of the monitoring can be compared against a hysteresis threshold, and a determination made that the state of the vehicle in the parking space has changed only if the measured result is above the hysteresis threshold.

The disclosure further includes a parking space monitoring system. The system can include a first parking sensor disposed within a parking space and configured to sense a change of state due to a vehicle entering or leaving the parking space, a second parking sensor disposed adjacent to the parking space, the second parking sensor comprising a video camera oriented to image video of at least a portion of the parking space, and a parking meter coupled to the video camera. The parking meter can include a processor, a memory and software code stored in the memory that are all disposed within a housing of the parking meter. The software code is executable by the processor and provides for the parking meter to receive a reading from the first parking sensor that is broadcast to the parking meter. The reading can be stored in memory. The processor can perform a machine vision analysis of the imaged video from the camera to determine whether the vehicle has entered or left the parking space. The processor can be configured to evaluate the reading from the first parking sensor to determine whether the vehicle has entered or left the parking space. The processor can be configured to conclude that a vehicle has entered or left the parking space only if the determinations of the machine vision analysis and the reading from the first parking sensor are in concordance.

The parking meter can be disposed adjacent to the parking space and the video camera is disposed within the housing of the parking meter. The parking meter can include an infrared light oriented to illuminate the parking space during imaging by the video camera.

The first parking sensor can be configured to read a magnetic field strength in the parking space. The first parking sensor can be disposed in the road, pavement or surface underneath the parking space, or the sensor can be embedded in a nearby structure, such as a curb adjacent to the parking space. The first parking sensor can broadcast its reading to the parking meter via a Bluetooth or other wireless communication protocol, and the meter is configured to receive such broadcast.

The processor in the meter can be further configured to determine whether the vehicle has entered or left the parking space via the machine vision analysis only upon a determination of state that persists for at least a predetermined period of time.

The disclosure also includes a parking meter that includes a housing disposed atop a pole. A video camera can be disposed within the housing and aimed towards a parking space adjacent to the parking meter such that the video camera can image video of at least a portion of the parking space. A processor, memory and software code stored in the memory can each be disposed within the housing. The software code is executable by the processor, which configures the processor to perform a background subtraction analysis on a portion of the imaged video from the camera to determine whether a vehicle has entered or left the parking space.

The processor can also be configured by the software code to determine whether the vehicle has entered or left the parking space via the background subtraction analysis only upon a determination of state that persists for at least a predetermined period of time. The processor can be further configured by the software code to determine whether the vehicle has entered or left the parking space via the background subtraction analysis only upon finding a concordance with a determination of state based upon data from a parking sensor that is separate from the video camera.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Referring to FIGS. 1A, 1B, 2 and 3, smart parking meters 100, such as those disclosed in U.S. Pat. Pub. Nos. 2014/0214499 A1 and 2014/0214500 A1 (which are both incorporated herein by reference in their entirety herein), can be deployed adjacent to various parking spaces. Such smart meters can include one or more cameras 102 arranged to monitor parking spaces 104 adjacent to the meter. The cameras 102 can be configured to capture video or still images.

As explained in U.S. Pat. Pub. No. 2014/0214499 A1, the meters 100 include microprocessors, memory and computer code that enable the meters to monitor parking events, including determining the presence of a vehicle 105 in a parking space 104, determining the identity of the vehicle, permitting the parking user to pay for parking time, determining parking violation notices, and other intelligent functions.

A computer readable program code can be stored in the physical memory (e.g., random access memory, flash memory or hard-drive) of the meter. The computer readable program code is configured such that when executed by the microprocessor, the code causes the meter to perform the steps of the invention described herein.

Figure 1A:
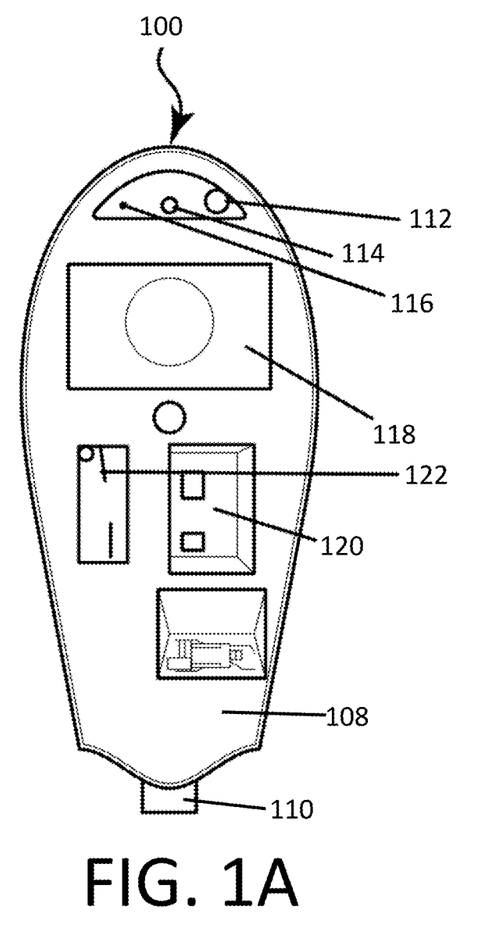
FIGS. 1A and 1B are front and back views, respectively, of a smart parking meter according to certain example embodiments.
Figure 1B:
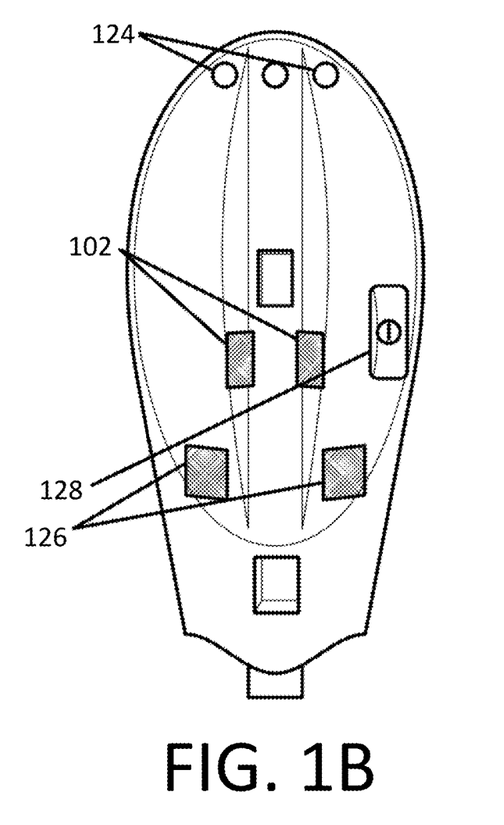

Referring to FIGS. 1A and 1B, each parking meter in certain embodiments includes an enclosure 108 mounted atop a pole 110. The housing 108 includes the electronics components mentioned above. In addition, the housing includes, on the front side, a speaker 112, front-facing camera 114 and microphone 116 disposed adjacent to the graphical user interface (e.g. touch screen) 118. A payment acceptance means 120 and coin slot 122 are also provided. The payment acceptance means can be a contactless or conventional card reader, or other known means for accepting payment.

The rear side of the housing 108 includes a plurality of violation indicator lights 124 windows through which the cameras 102 can see, infrared (IR) illuminators 126 to provide supplemental IR light to aid the cameras' sight, and a lock mechanism 128 to keep unwanted persons from opening the housing 108.

Each of the meters 100 can also be networked with a central or control computer for added control and functionality as explained in U.S. Pat. Pub. No. 2014/0214499 A1. Further, one smart meter 100 can be networked with one or more remote cameras disposed adjacent to additional parking spaces so that one meter can monitor several different parking spaces and parking events.

The same or similar smart parking meter 100 can also be configured as a kiosk and placed adjacent to a parking lot or ramp to monitor entry and exit events at a lot or ramp as explained in U.S. Pat. Pub. No. 2014/0214500 A1. A kiosk can also simultaneously function as a parking space meter. A single kiosk or meter can further be coupled to one or more remote cameras that each monitor individual parking spaces so that the single kiosk or meter monitors multiple individual parking spaces or events throughout a lot, ramp or street segment.

Note that when the term meter is used throughout this application, such use should be understood to include both smart meters and kiosks.

Figure 2:
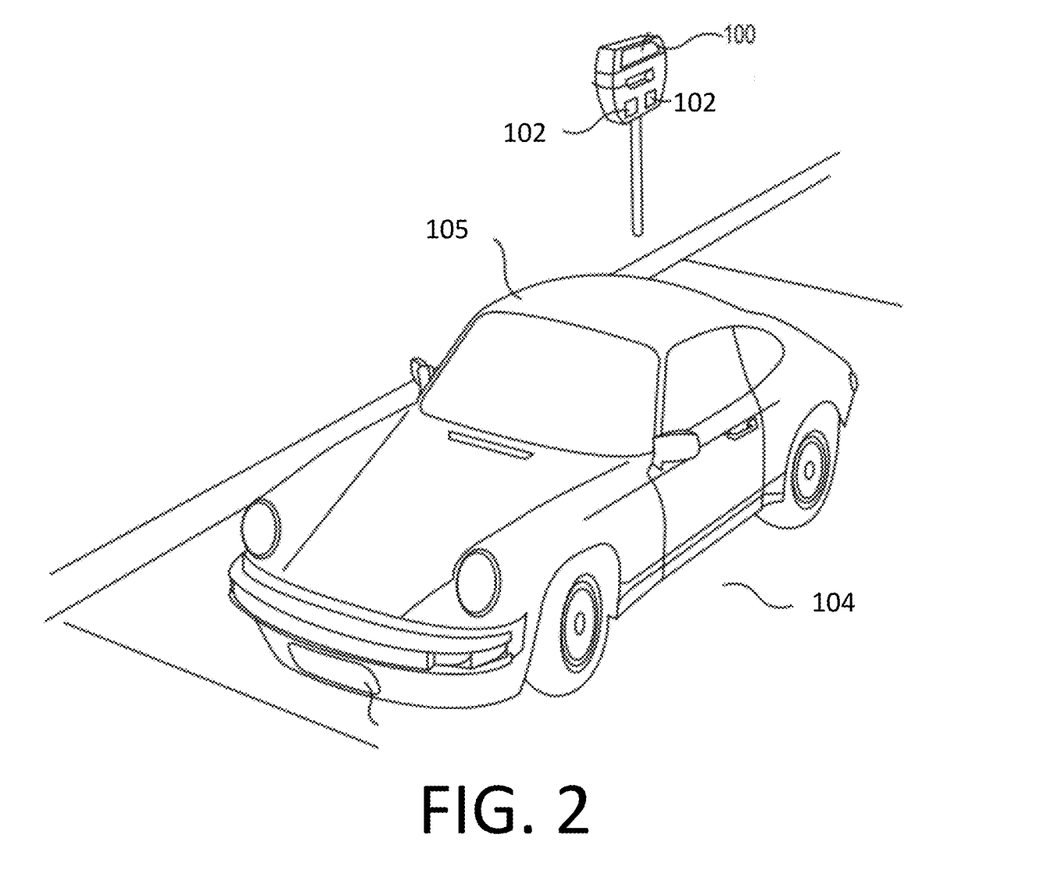
FIG. 2 is a diagram of a vehicle in a parking space being monitored by a smart parking meter according to certain example embodiments.
Figure 3:
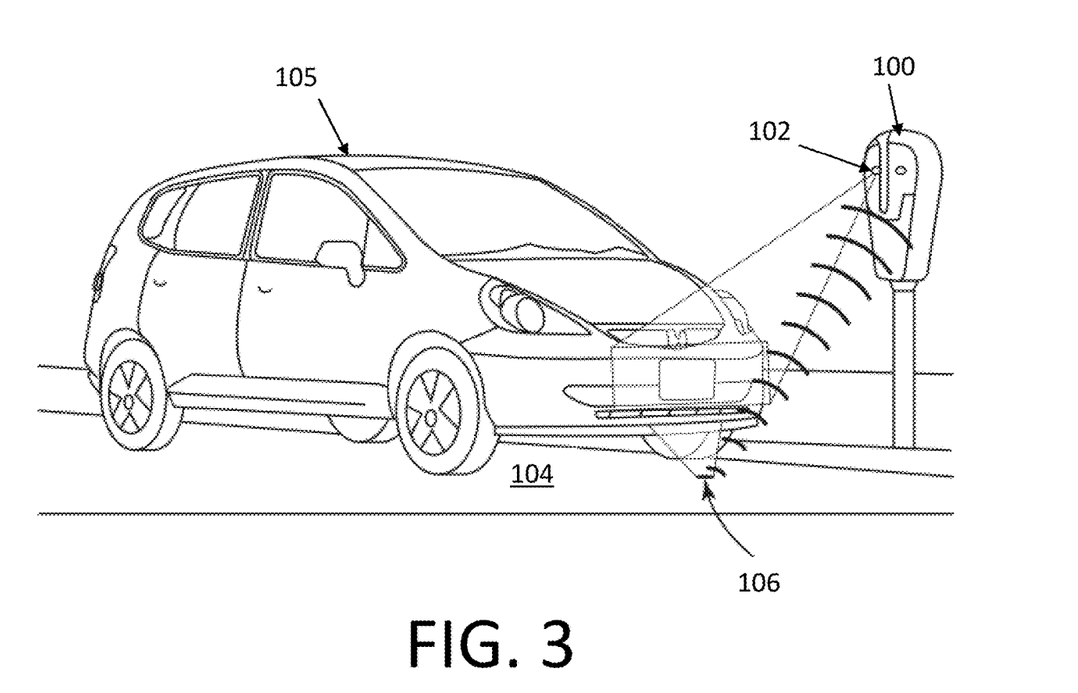
FIG. 3 is another diagram of a vehicle in a parking space being monitored by a smart parking meter according to certain example embodiments.

Referring now to FIGS. 2-3, the smart parking meter 100 includes a camera 102 to view a portion of a vehicle when the vehicle 105 is located in the parking space 104 being monitored. In FIG. 2, the rear side of the vehicle 105 is being viewed by the camera 102. In FIG. 3, the front side of the vehicle 105 is monitored by the camera 102.

In addition, an in-ground sensor 106 is embedded in the road underneath the vehicle 105 when the vehicle is present in the parking space 104. The in-ground sensor 106 can also be located in alterative positions such as in the curbing.

The in-ground sensor 106 is preferably a magnetic sensor. The sensor can be disc-shaped to facilitate embedding in the roadway. The sensor 106 can alternatively perform sensing of the vehicle using other means such as radar.

The in-ground sensor 106 broadcasts a status message to the nearby meter 100 as shown in FIG. 3. The broadcast can be performed using low power Bluetooth or other short range wireless communications protocol. The broadcast frequency can be continuous or periodic. For example, the status of the in-ground sensor 106 can be broadcast once per second, ten times per second, etc.

In one preferred embodiment, the magnetic in-ground sensor 106 is powered by an internal lithium-based battery and a sensing/broadcast cycle is performed once per second in order to conserve battery life. A sensor life expectancy of several years can be achieved using such battery and operating method. In other embodiments, the in-ground sensor can be hard-wired for power and/or broadcast.

The cameras or optical sensors 102 disposed in the parking meter (or remotely from the meter housing as discussed above) use image sensors (e.g. ccd or cmos) and apply a background subtraction methodology to determine whether a vehicle 105 has entered or left the parking space 104. Note that the background subtraction methodology can also be referred to as foreground subtraction and foreground detection.

Figure 4:
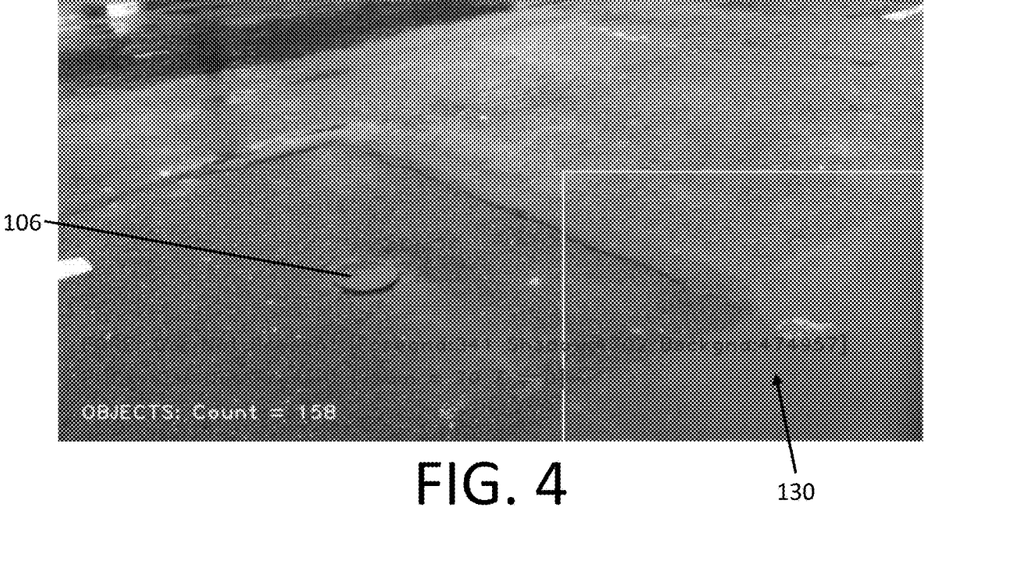
FIG. 4 is an image of a parking space being detected for the presence of a vehicle according to certain example embodiments.

In particular, the vehicle status determination protocol is based upon monitoring a segment or window of the image sensor's viewed image. Referring to FIG. 4, a monitored window portion 130 in the lower right quadrant of the total captured image is designated for monitoring as part of the background subtraction technique. Detected objects can also be color-coded on the viewer's screen (at central control) to quickly note progress and lock status.

Note that the in-ground sensor 106 can be seen as a disc-shaped object in FIG. 4 embedded in the roadway.

Figure 5:
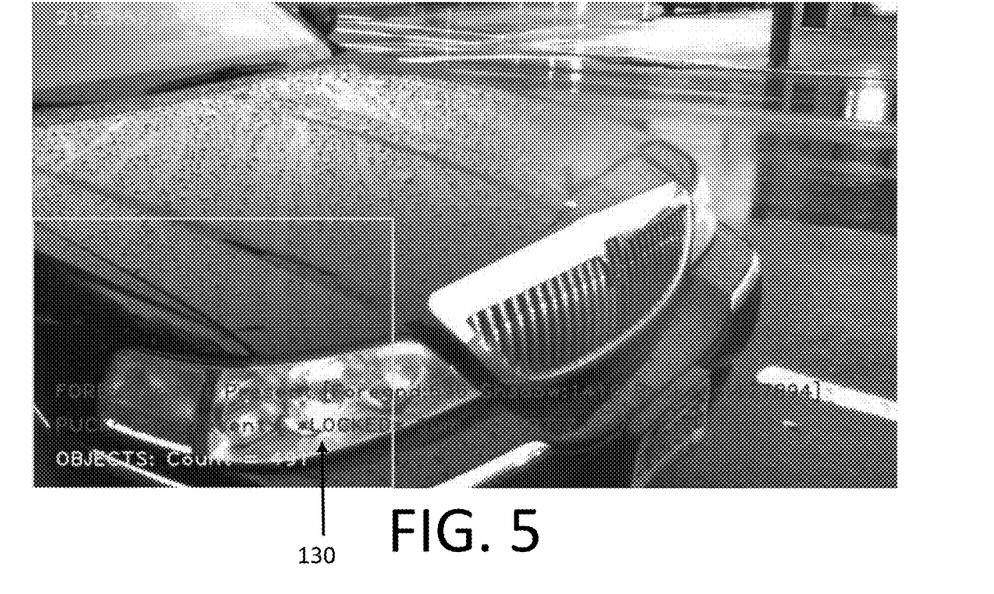
FIG. 5 is another image of a parking space being detected for the presence of a vehicle according to certain example embodiments.

Now referring to FIG. 5, a vehicle is present in the view of the image sensor, and the background subtraction image processing technique is resolving whether a vehicle is present based upon the monitored window portion 130 in the lower left quadrant. The frequency of the background substation monitoring employed can be varied. For example, each processor clock cycle, or some other less frequent evaluation can be performed. The result of the background subtraction evaluation is a determination of a state change (e.g., a vehicle entered an open space, or a vehicle left an occupied space).

Figure 6:
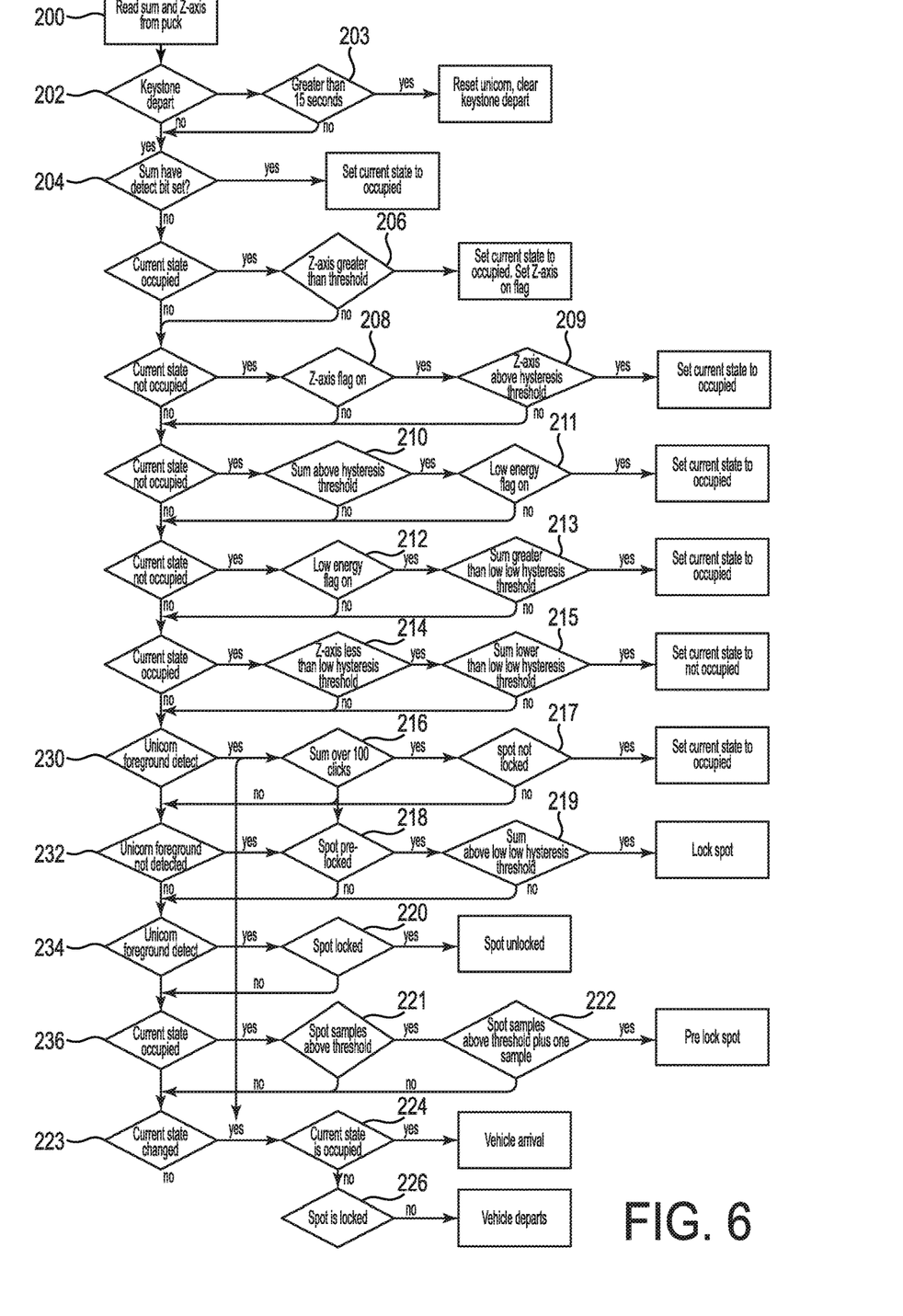
FIG. 6 is a vehicle detection algorithm logic diagram according to certain example embodiments.

Next, the overall vehicle detection algorithm is employed. The detection algorithm, method and technique combine data from the in ground sensor 106 and from the camera 102. FIG. 6 provides a detailed step-by-step breakdown of the algorithm and method.

First, the overall magnetic field strength "sum" is read from the in-ground sensor 106 in step 200 along with the magnetic field strength in the "z-axis" (vertical direction normal to the parking surface). Then in steps 202 and 203, it is determined by the magnetic sensor 106 whether the parking space 104 has been vacated and stayed vacant for more than 15 seconds. If yes, then the state of the camera-based computer vision (image sensing algorithm—referred to as "Unicorn" in FIG. 6) is set to a "departed" state. But if the determination by the data provided by the in-ground magnetic sensor 106 is no and the magnetic field reading is above a pre-set threshold in step 204, then the current state of the parking space is determined to be occupied.

Next, a series of double check queries are performed by the processor in the parking meter as part of the algorithm to ensure that no false positive or false negative state determinations have been made by the in ground sensor 106. A query 206 is performed to confirm that the magnetic sensor's Z-axis reading is greater than a pre-set threshold. The processor also determines whether the magnetic sensor's Z-axis flag is on 208, whether the Z-axis reading is above a hysteresis threshold 209, whether the Sum value is above a hysteresis threshold 210, whether the low energy flag has been set to "on" 211 and 212, whether the Sum value is greater than a low low hysteresis threshold 213, whether the Z-axis value is less than a low hysteresis threshold 214 and whether the Sum value is lower than the low low hysteresis threshold 215. These queries by the processor check various parameters and states of the in-ground sensor's 106 readings and state to ensure that a valid parking space state change is being set by the overall system.

Next, the processor performs a series of queries involving the machine vision evaluation of the parking space to ensure that a conclusion regarding the occupancy state of the parking space being evaluated is reached with a high degree of certainty. In FIG. 6, if the machine vision detection determines that the space is occupied by a vehicle 230, then the Sum value sensed by the magnetic sensor 106 is evaluated to see if it is over a 100 click threshold 216 and it is determined whether the machine vision is in a locked status 217. Next, if the machine vision detection determines that the space is not occupied by a vehicle 232, then the machine vision analysis is evaluated to a pre-locked status 218 and the Sum value sensed by the magnetic sensor 106 is evaluated to see if it is above the low low hysteresis threshold 219.

The determinations for parking space locking 220 and pre-locking are also explained in FIG. 6. Once the machine vision detects that the space is occupied 234, a positive lock status 220 is changed to unlocked. If the current conclusion of the system is that the parking space state is occupied 236 and the samples taken by the machine vision analysis are above a pre-set threshold 221 and above that threshold plus one, then the status is set to pre-locked.

The queries above are double-checks to using the machine vision evaluation to ensure that the determination made from the in-ground sensor is confirmed. If any of these double-check queries fails to confirm the initially determined state, then the current state is changed 223 and the algorithm iterates again. The specific outcome of these determinations described above is provided in FIG. 6

A vehicle is determined to be arriving 224 if the current state is "occupied" and a subsequent valid iteration of the algorithm determines that the state has changed from "unoccupied" to "occupied". The reverse is true for determining a vehicle departure 226.

By combining the state determinations and sensing data from both the in-ground sensor 106 and the machine vision analysis using the image sensor 102, a high degree of confidence can be formed for achieving the correct state of vehicle occupancy in a parking space. Thus, the occurrence of false readings as compared to the conventional techniques can be greatly reduced or eliminated. Reducing false readings ensures that parking revenue is maximized and that there is no false issuance of parking tickets and the ill will associated with the same.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A method of determining whether a vehicle is present in a parking space, the method comprising:
monitoring the parking space with a first vehicle detection technique via a sensor coupled to a parking meter, wherein the sensor is not a camera;
monitoring the parking space with a second vehicle detection technique via a camera coupled to the parking meter;
determining via the second vehicle detection technique whether the vehicle is present in the parking space;
evaluating an output value of the sensor utilized in the first vehicle detection technique via a processor provided to the parking meter to determine whether the output value is above a preset threshold value when the second vehicle detection technique determines that the parking space is occupied; and
concluding that the vehicle is present in the parking space only when both of the first and second vehicle detection techniques indicate that the vehicle is present in the parking space and the output value of the sensor utilized in the first vehicle detection technique is above the preset threshold value.

2. The method of claim 1, further comprising concluding that the vehicle is not present in the parking space only when both of the first and second vehicle detection techniques indicate that the vehicle is not present in the parking space.

3. The method of claim 1, wherein the step of monitoring the parking space with the first vehicle detection technique comprises:
disposing a magnetic sensor beneath the parking space to serve as the sensor for the first vehicle detection technique; and
sensing a change in the magnetic field in the parking space with the magnetic sensor.

4. The method of claim 3, further comprising: broadcasting a magnetic field data value from the magnetic sensor to the parking meter.

5. The method of claim 3, wherein the step of monitoring the parking space with the second vehicle detection technique comprises performing a machine vision analysis of the parking space with the camera.

6. The method of claim 1, wherein the step of monitoring the parking space with the second vehicle detection technique comprises performing a machine vision analysis of the parking space with the camera.

7. The method of claim 1, further comprising concluding that a state of the vehicle has not changed when one of the first and second vehicle detection techniques indicates that the vehicle is not present in the parking space and the other of the first and second vehicle detection techniques indicates that the vehicle is present in the parking space.

8. The method of claim 1, wherein the step of monitoring the parking space with a first vehicle detection technique includes:
monitoring the parking space for a change of vehicle state for a predetermined length of time; and
concluding that the vehicle state has changed only if a monitored parking space state change persists for the entire predetermined length of time.

9. The method of claim 1, wherein the step of monitoring the parking space with a second vehicle detection technique includes performing a background subtraction operation on a video feed of a camera trained on the parking space.

10. The method of claim 1, wherein at least one of the steps of monitoring the parking space with the first and second vehicle detection techniques includes:
comparing the output value of the sensor utilized in the first vehicle detection technique against a hysteresis threshold value for the output value; and
determining that an occupancy state of the vehicle in the parking space has changed only if the output value of the sensor utilized in the first vehicle detection technique is above the hysteresis threshold value.

11. A parking space monitoring system, comprising:
a first parking sensor provided to a parking space and configured to sense a change of state due to a vehicle entering or leaving the parking space;

a second parking sensor disposed adjacent to the parking space, the second parking sensor comprising a video camera oriented to image video of at least a portion of the parking space;

a parking meter coupled to the video camera, the parking meter including a processor, a memory and software code stored in the memory that are all disposed within a housing of the parking meter, the software code being executable by the processor, wherein the first parking sensor is not a video camera and is configured to provide an output value to the processor, wherein the processor is configured to perform a machine vision analysis of the imaged video from the video camera to determine whether the vehicle has entered or left the parking space, wherein the processor is configured to evaluate the output value from the first parking sensor to determine whether the vehicle has entered or left the parking space, wherein the processor is configured to evaluate the output value of the first parking sensor to determine whether the output value is above a preset threshold value when the second vehicle detection technique determines that the parking space is occupied, and wherein the processor is configured to conclude that a vehicle has entered or left the parking space only if the determinations of the machine vision analysis and the output value from the first parking sensor are in concordance and the output value of the first parking sensor is above the preset threshold value.

12. The system of claim 11, wherein the parking meter is disposed adjacent to the parking space and the video camera is disposed within the housing of the parking meter.

13. The system of claim 12, wherein the parking meter includes an infrared light oriented to illuminate the parking space during imaging by the video camera.

14. The system of claim 11, wherein the first parking sensor is configured to output a measured magnetic field strength value.

15. The system of claim 11, wherein the first parking sensor is embedded in a road surface of the parking space.

16. The system of claim 11, wherein the first parking sensor provides the output value to the processor of the parking meter via a Bluetooth communication protocol, and wherein a Bluetooth receiver is included within the housing of the parking meter and coupled to the processor.

17. A parking space monitoring system, comprising:

a first parking sensor provided to a parking meter and configured to sense a change of state due to a vehicle entering or leaving the parking space;

a second parking sensor provided to the parking meter, the second parking sensor comprising a video camera oriented to image video of at least a portion of the parking space;

a processor, a memory and software code stored in the memory that are all disposed within a housing of the parking meter, the software code being executable by the processor, wherein the first parking sensor is not a video camera and is configured to provide an output value to the processor, wherein the processor is configured to perform a machine vision analysis of the imaged video from the video camera to determine whether the vehicle has entered or left the parking space, wherein the processor is configured to determine whether the vehicle has entered or left the parking space via the machine vision analysis only upon a determination of state that persists for at least a predetermined period of time, wherein the processor is configured to evaluate the output value from the first parking sensor to determine whether the vehicle has entered or left the parking space, and wherein the processor is configured to conclude that a vehicle has entered or left the parking space only if the determinations of the machine vision analysis and the evaluation of the output value from the first parking sensor are in concordance.

18. The system of claim 17, wherein the processor is configured to evaluate the output value of the first parking sensor to determine whether the output value is above a preset threshold when the machine vision analysis of the imaged video from the video camera determines that the parking space is occupied, and wherein the processor is configured to conclude that a vehicle has entered or left the parking space only if the output value of the first parking sensor is above the preset threshold.

19. The system of claim 17, wherein the first parking sensor is a radar sensor.

20. The system of claim 17, wherein the parking meter and the video camera are both disposed in a stationary position adjacent to the parking space.

* * * * *